United States Patent Office 3,417,819
Patented Dec. 24, 1968

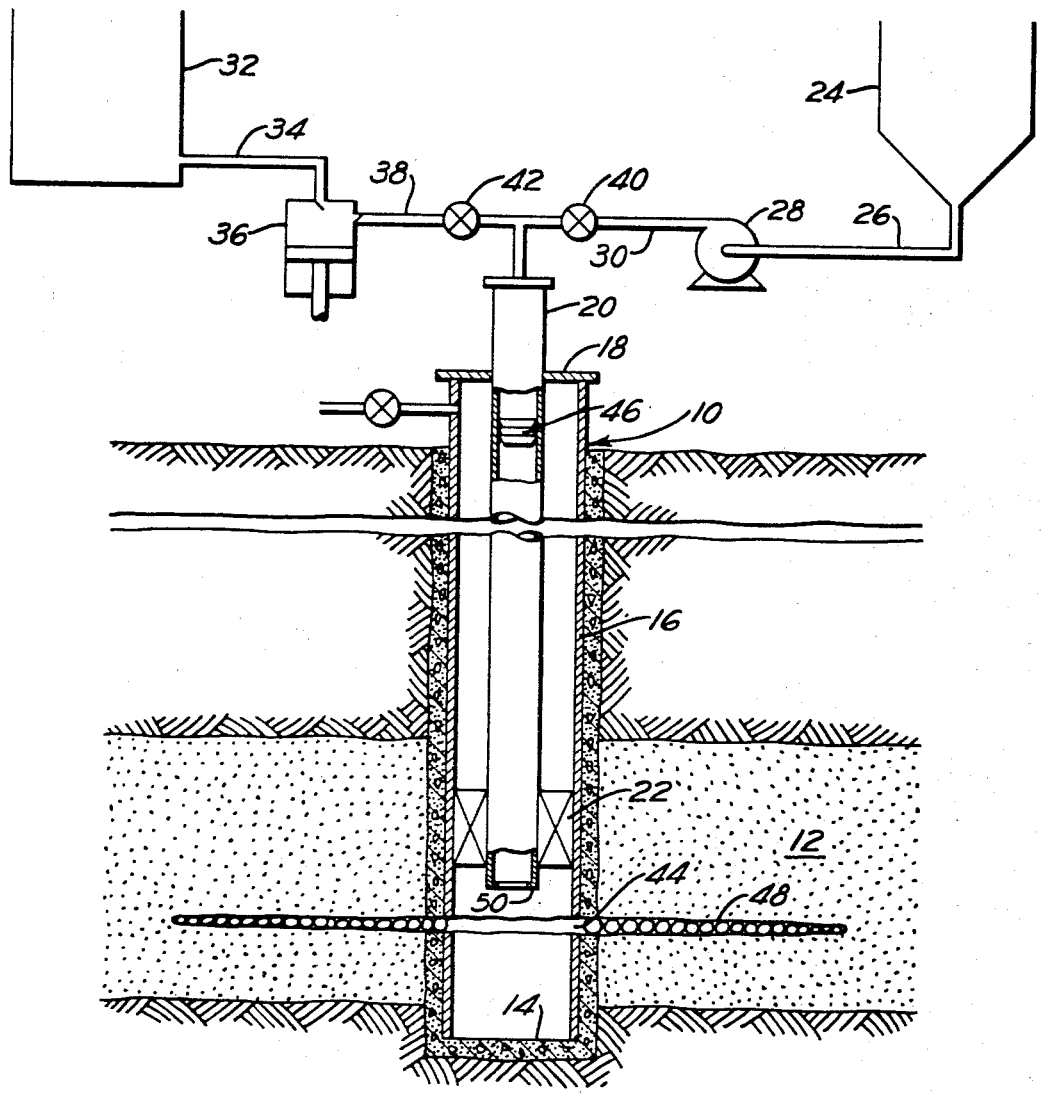

3,417,819
METHOD OF FRACTURING WITH A HIGH-VISCOSITY LIQUID
Malcolm Robert Jesse Wyllie, Allison Park, Pa., assignor to Gulf Research & Development Company, Pittsburgh, Pa., a corporation of Delaware
Filed Nov. 1, 1966, Ser. No. 591,232
4 Claims. (Cl. 166—42)

ABSTRACT OF THE DISCLOSURE

A method of fracturing a subsurface formation penetrated by a well allowing use of pumps of low volumetric capacity in which a fracturing liquid having a viscosity in excess of 100,000 centipoises and an API liquid loss less than 5 milliliters per 30 minutes is placed in a well. Propping agent particles having a size of 1/8 inch to 1 inch are suspended in the fracturing liquid. A readily pumpable following liquid is pumped into the well after the fracturing liquid to increase the pressure to initiate a fracture in the formation surrounding the well and displace fracturing liquid into the fracture.

---

This invention resides in a method of stimulating production of oil from a well, and more particularly to a method of fracturing an underground formation penetrated by a well to increase the rate of flow of fluids into the well.

Hydraulic fracturing of underground formations is widely used to increase the productivity of oil and gas wells. In the fracturing operation, a liquid is pumped down the well at a rate faster than the liquid can leak off into the exposed formation to increase the pressure to a level at which the formation breaks down. A propping agent is suspended in a liquid, and the liquid is displaced down the well and outwardly into the fracture. After the desired amount of propping agent has been displaced into the fracture, pumping is stopped and the propping agent is deposited in the fracture to hold the fracture open.

Because of the relatively high cost of hydraulic fracturing, many wells which could be stimulated by fracturing are not fractured. The increased productivity of fluids from the well may not be sufficient to justify the investment required for fracturing. A major part of the cost of fracturing is for rental of truck-mounted pumps used to displace fracturing liquid down the well and outward into the formation. A number of pumps having a total capacity of more than 40 barrels per minute requiring more than 5,000 horsepower are sometimes used in a single fracturing job.

Sometimes low productivity of a well is caused by damage to the formation immediately adjacent the well as a result of infiltration of drilling mud liquids or plugging of openings by drilling mud solids. The formation at a substantial distance from the well, being undamaged, has a high enough permeability to allow high rates of production. In such instances, a substantial increase in the productivity of the well can be obtained without conducting the conventional fracturing operation in which a fracture is made to extend from the well a large distance into the formation. Moreover, because of the radial flow pattern the principal resistance to flow is near the well and if a well is producing at a rate near the maximum allowable by state regulatory agencies, little is to be gained by a large fracture that will allow greatly increased amounts of formation fluids to flow into the outer reaches of the fracture. A fracturing process that created a fracture of very high flow capacity for a limited radial distance would in each such instance allow the operator to obtain substantially all the benefits that would result from a high-cost fracture of large radial extent, and would be more effective than a fracture of large radial extent but rather limited flow capacity.

This invention resides in a method for stimulating a well by placing in the well large-size propping agent particles suspended in a highly viscous carrying liquid having a very low liquid loss. The carrying liquid is displaced slowly down the well by means of a pump of low volumetric capacity. In a preferred embodiment, a readily pumpable liquid, referred to as a following liquid, free of propping agent is pumped into the upper end of the well onto the carrying liquid to create the pressure required to break down the formation and to displace the carrying liquid and suspended propping agent into the fracture. The high viscosity and low liquid loss characteristics of the fracturing liquid allow a pressure adequate to fracture the formation to be obtained without the use of the expensive high-rate pumps ordinarily used. It is advantageous to insert a plug after the carrying liquid to separate the carrying liquid and the following liquid.

The single figure of the drawing is a diagrammatic view, partially in vertical section, of a well after fracturing by the method of this invention.

The liquid used in this invention to initiate the fracture and to transport the propping agent into the fracture has both a very low liquid loss and very high viscosity. Because of the very low liquid loss, the fracture can be initiated without danger of excessive screening out with a liquid having propping agent suspended in it. It is preferred, however, that a spearhead of liquid devoid of propping agent be used to initiate the fracture. For convenience, the same high viscosity, low liquid loss liquid is preferred for the spearhead for initiation of the fracture and for the carrying liquid for suspending the propping agent. The term fracturing liquid is used to designate both the spearhead and carrying liquid.

The liquid loss of the fracturing liquid as determined by the API Test No. RP 39 should be less than 5 milliliters per 30 minutes. The low liquid loss is essential to prevent leaking of liquid from the well into the formation at a rate high enough to prevent building up of a pressure adequate to fracture the formation. A fracturing liquid having the necessary low liquid loss can be obtained by incorporating in the fracturing liquid a material that will temporarily seal the exposed faces of the formation and prevent flow of the liquid through them. The most common liquid-loss reducing materials are solid materials such as silica flour which filters from the liquid to deposit an impervious filter cake. Other liquid-loss reducing materials are blown asphalt and mixtures of finely divided solid particles and an agglutinant such as described in U.S. Patent No. 2,779,735.

It is also essential to this invention that the liquid have a viscosity of at least 100,000 centipoises. It is a characteristic of this invention that the rate of flow of the liquid in which the propping agent is suspended is very low both in the tubing within the well and in the fracture. A high viscosity is essential to support the propping agent while it is in the well bore to open a wide fracture in the formation and to carry the propping agent to the outer boundary of the fracture.

If the fracturing liquid is an oil such as residual oil or crude oil, its viscosity can be increased to 100,000 centipoises or above by the incorporation of suitable gelling agents such as soaps such as alkali and alkaline earth metal, stearates, oleates, palmitates, and rosinates. In a suitable example of a gelled oil fracturing liquid, Miga crude oil (Venezuela) is gelled with commercial additives to have these desired viscosities. Mixing 6.75 percent U-28 (fatty acids) and 4.5 percent U-34 (caustic) with this crude at 85° F. resuts in a Brookfield viscosity (with a #7 spindle) of 150,000 centipoises at 4 r.p.m. or 260,-

000 centipoises at 2 r.p.m. The API fluid loss of this gel is 13 milliliters. Addition of ½ percent of J-84 (a finely powdered inert siliceous material) to the gel reduces the API fluid loss to 3 milliliters. U-28, U-34, and J-84 are commercial additives sold by Dowell, Inc., for control of properties of liquids used in fracturing operations. A high molecular weight organic polymer (such as Dowell's J-105) may be added in concentrations of 5 to 10 gallons per 1,000 gallons of gelled oil to reduce the pump pressure required to pump the high viscosity fluid down the well.

When an aqueous fracturing liquid is used, the viscosity can be obtained by the incorporation of gums such as karaya, batu, or guar gum. A suitable gelled water fracturing liquid is prepared by mixing 3 percent of WG-5 (Halliburton Company guar gum additive) in water. This gel has a Brookfield viscosity of 200,000 centipoises when when read with a #7 spindle at 4 r.p.m. A 4 percent gel under the same conditions will produce a 450,000 centipoise gel. The standard API fluid loss of the 3 percent gel is 12 milliliters in 30 minutes. Addition of 2 percent "Adomite Aqua," a commercial additive sold by Continental Oil Company to reduce the liquid loss of aqueous liquids, to the gel reduces the fluid loss to 5 milliliters.

It is essential to this invention that both the liquid-loss reducing additive and gelling material be incorporated in the fracturing liquid. If, for example, the viscosity of the fracturing liquid is increased to give the desired low water-loss characteristics without the incorporation of suspended insoluble solid particles, the viscosity would be so high that the liquid could not be readily displaced down the well.

Any of the conventional propping agents such as sand, nutshells, glass beads, etc., can be suspended in the fracturing liquid. The propping agents are incorporated in the fracturing liquid in a concentration of ½ to 5 pounds per gallon of propping agent, preferably 1 to 3 pounds per gallon. In the preferred embodiment of this invention in which a fracture of small radial extent is made to extend beyond that portion of the formation in which skin damage occurs, a small amount of propping agent and fracturing liquid is used. Ordinarily that small volume of fracturing liquid is less than the volume of the tubing; hence, it is not necessary to put the propping agent through the high-pressure pump used to initiate and extend the fracture. For this reason, it is preferred that the propping agent have a large size within the range of ⅛ inch to 1 inch in diameter, preferably within the range of ¼ inch to ½ inch in diameter.

Referring to the drawing, a well indicated generally by the reference numeral 10 is illustrated extending through a productive zone 12 to a total depth 14. Casing 16 is shown set in the usual manner through the productive formation 12. The upper end of casing 16 is closed by a suitable closure 18.

In FIGURE 1, the well 10 is shown with a tubing string 20 in place for the fracturing operation. A packer 22, which closes the lower end of the annulus between the tubing 20 and the casing 16, is run into the well on tubing 20.

At the surface, a blender 24 is provided for making up the fracturing liquid. Blender 24 is provided with suitable agitating apparatus for mixing the liquid and the additives used to reduce the liquid loss and increase the viscosity as well as for suspending the propping agent in the fracturing liquid. A line 26 from the bottom of blender 24 leads to a pump 28 capable of handling the propping agent suspended in the fracturing liquid. In the embodiment illustrated in the drawing, pump 28 may be a low-pressure pump since its function is merely to transfer the fracturing liquid from the blender to the well. A line 30 extends from the outlet of pump 28 to the upper end of the tubing 20.

A follower liquid storage tank 32 has an outlet line 34 extending to a high-pressure, low-volumetric capacity pump 36. It is one of the advantages of this invention that in place of the very expensive high-capacity fracturing pumps required in the usual fracturing operation, a single low-cost pump of low volumetric capacity can be used. Pump 36 may have a volumetric capacity as low as 0.1 barrel per minute. A pump capacity of 0.25 to 2.0 barrels per minute is preferred. Pumps capable of pumping at higher rates can be used but are not required and do not justify their higher cost. It is essential that pump 36 be capable of applying a pressure adequate to break down the formation, but, in the embodiment of the invention using a follower liquid, pump 36 does not have to handle the propping agent. A line 38 extends from the outlet of pump 36 to the upper end of tubing 20. Valves 40 and 42 are provided in lines 30 and 38, respectively, to permit liquid from either pump 28 or pump 36 to be delivered into the upper end of the tubing 20.

While it is preferred in the fracturing method of this invention that casing be set through the target formation as illustrated in the drawing, the fracture can be made with an open hole completion through the target formation. If casing is set through the target formation, it is essential that an opening be made in the casing to expose a portion of the formation to the pressure of the fracturing liquid. Suitable openings can be made by the usual perforations such as those produced by shaped charges. In the method shown in the drawing, a single circumferential notch 44 has been cut through the casing. It is desirable that the notch 44 extend a short distance into the formation surrounding the casing. After the notch 44 has been cut, the packer 22 is run into the well on the lower end of tubing 20 and set immediately above the notch 44. The connections illustrated in the drawing are then made.

The highly viscous fracturing liquid having the necessary low liquid-loss characteristics is made up in blender 24. It is preferred that a small spearhead, for example, one barrel, of the fracturing liquid devoid of propping agent, be pumped into the well before the propping agent is suspended in the liquid. Then the desired volume of fracturing liquid containing suspended propping agent is pumped from the blender 24 into the tubing 20.

The process of this invention is most useful in producing high-capacity fractures of small radial extent. Because of the unique low filtrate-loss characteristics of the fracturing liquid, the loss of liquid into the system is very small and the amount of fracturing liquid required is such that in most instances all of the fracturing liquid can be placed in the tubing 20. It is then possible to pump a follower liquid of lower viscosity, which can be more readily handled by the pump, during the phase of the fracturing process in which the pressure is increased to cause fracturing of the formation. If the volume of the tubing does not exceed the volume of fracturing liquid, the high-pressure pump 36 will be connected to the blender 24 to pump the fracturing liquid into the well.

After the desired volume of fracturing liquid has been placed in tubing 20, valve 30 is closed and pump 28 is shut down. It is preferred that a plug 46 having suitable ribs engaging the wall of tubing 20 to prevent leakage past the plug be dropped in tubing 20 above the fracturing liquid, particularly if the following liquid should have a higher density than the carrying liquid. Thereafter, a following liquid from storage tank 32 is pumped by pump 36 into the upper end of tubing 20 above plug 46. The following liquid can be water or an oil of low viscosity that is easily pumpable and will flow readily to the pump 36. The pumping is contitnued to displace the spearhead from the lower end of tubing 20 into contact with the formation exposed by notch 44. Because of its low liquid-loss characteristics, the spearhead seals the faces of the formation and prevents loss of liquid into the surrounding formation. Continued pumping increases the pressure to a level at which the formation breaks down to initiate the fracture 48. Pumping is continued to displace the fracturing liquid with suspended propping agent into the fracture 48.

The low liquid-loss characteristics of the fracturing liquid result in a fracture having a volume only slightly less than the volume of the fracturing liquid and spearhead. When a predetermined volume of fracturing liquid has been displaced into the fracture, the well is then shut in. In some instances, it may be desirable to provide a shoulder 48 extending inwardly from the lower end of the tubing 20. Engagement of plug 46 with the shoulder 48 will cause an increase in the pressure to indicate that all of the fracturing liquid has been displaced from the tubing. A very gradual bleed off of fracturing liquid reduces the pressure in the well and deposits the propping agent in the fracture. The faces of the fracture close on the propping agent and hold it in place.

After shutting the well in for a period of four hours or more, the pressure on the well is released to permit flow from the formation into the well. In some instances, formation fluids will wash the fluid-loss additive from the face of the fracture and wash it and the carrying liquid through the fracture and into the well. Many gelling agents used in the preparation of the high-viscosity liquids break down when exposed for an extended period to the conditions existing in the formation 12. If the gelling agent does not break down spontaneously, the carrying liquid can be followed by a solvent or peptizer which is slowly displaced into the fracture to reduce the viscosity of the liquid in the fracture and thereby reduce resistance to flow through the fracture when the well is turned around.

Because of the extremely high viscosity and the very low liquid loss of the fracturing liquid, there is substantially no flow of the fracturing liquid through the formation beyond the fracture. For this reason, no substantial pressure is applied to the formation beyond the fracture with the result that the radial extent of the fracture is diminished. Continued pumping of the fracturing liquid into the formation then tends to open the fracture wider rather than to extend it radially as in conventional fracturing operations. In providing a fracture of relatively limited radial extent but of increased width, the fracturing process of this invention is particularly useful in formations having satisfactory permeability but which have been subjected to substantial skin damage. The wide fracture allows very large propping agents to enter the fracture and provides a high flow capacity adjacent the well where resistance to flow is most severe.

The very low liquid loss and high viscosity of the fracturing liquid allows the use of a small volume of fracturing liquid. In most instances, the volume of fracturing liquid required is less than the volume of the tubing used in the well. It is not, therefore, necessary to pass the propping agent through the high pressure pump. Low pressure pumps capable of handling propping agent particles of large size can be provided at low cost if it is not necessary for the pumps to develop a high pressure.

When the volume of carrying liquid used in the fracturing method exceeds the volume of the tubing, the pump used to inject the carrying liquid into the well must be capable of supplying a pressure adequate to hold the fracture open against the pressure of the overburden. By providing a suitable pipe from the blender to the inlet of pump 36, pump 36 can be used to pump both the carrying liquid and the following liquid. It will then be necessary to limit the propping agent to a size that can be handled by pump 36.

The fracturing method of this invention provides a low cost method of greatly increasing the productivity of wells in which the principal resistance to flow is in the formation immediately adjacent to the well. The method is particularly useful in making fractures having an area equivalent to a circular fracture approximately five to twenty-five feet in radius. Because of the very low liquid-loss characteristics of the fracturing liquid and the relatively small radial extent of the fracture, the total amount of fracturing liquid pumped down the well is small. In those instances when the volume of fracturing liquid is less than the volume of the tubing used to deliver the liquid down the well, it is then possible to operate the pump that supplies the pressure initiating the fracture and displacing the carrying liquid into the fracture on a propping-agent-free, easily pumped liquid such as diesel oil. Such operation allows greater freedom in the size of propping agent used to hold the fracture open. The very low liquid loss and the high viscosity of the carrying liquid allow deposition of the propping agent in a monolayer or a multilayer pack as desired by control of the propping agent size and its concentration in the carrying liquid.

I claim:
1. A method of fracturing an underground formation penetrated by a well comprising introducing fracturing liquid having a viscosity of at least 100,000 centipoises and an API liquid loss less than 5 milliliters per 30 minutes into the well, said fracturing liquid having suspended therein ½ pound to 5 pounds of propping agent per gallon, said propping agent having a particle diameter of ⅛ inch to 1 inch, pumping into the well after the fracturing liquid at a rate of 0.25 to 2.0 barrels per minute a readily pumpable following liquid devoid of propping agent and having a low viscosity to increase the pressure applied on the following liquid to initiate a fracture and displace the fracturing liquid and suspended propping agent into the fracture, and shutting the well in whereby the propping agent is deposited in the fracture.

2. A method as set forth in claim 1 in which the volume of fracturing liquid is adapted to create a fracture with an area equivalent to a circular fracture 5 to 25 feet in radius.

3. A method as set forth in claim 1 in which a liquid devoid of propping agent and having a viscosity of at least 100,000 centipoises and an API liquid loss less than 5 milliliters per 30 minutes is injected into the well ahead of the fracturing liquid.

4. A method as set forth in claim 1 in which a plug is inserted in the well between the fracturing liquid and the following liquid.

References Cited

UNITED STATES PATENTS

| | | | |
|---|---|---|---|
| 2,596,137 | 5/1952 | Fast | 166—42 X |
| 2,779,735 | 1/1957 | Brown et al. | 252—8.55 |
| 2,866,754 | 12/1958 | Cardwell et al. | 166—42 X |
| 2,950,247 | 8/1960 | McGuire et al. | 166—42 X |
| 2,965,172 | 12/1960 | Da Roza | 166—42 |
| 3,065,171 | 11/1962 | Morrow et al. | 166—42 X |
| 3,121,464 | 2/1964 | Huitt et al. | 166—42 |
| 3,351,079 | 11/1967 | Gibson | 252—8.55 X |

CHARLES E. O'CONNELL, *Primary Examiner.*

JAN A. CALVERT, *Assistant Examiner.*